T. A. EDISON.
TELEPHONE.
No. 266,022. Patented Oct. 17, 1882.
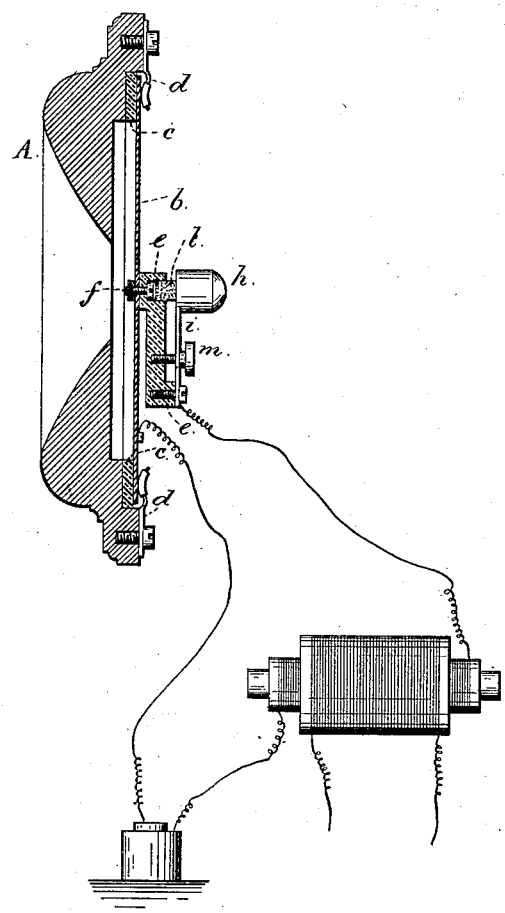
Witnesses:
J. Staib
Chas H. Smith
Inventor
Thomas A. Edison
per Lemuel W. Serrell
Atty

UNITED STATES PATENT OFFICE.

THOMAS A. EDISON, OF MENLO PARK, NEW JERSEY.

TELEPHONE.

SPECIFICATION forming part of Letters Patent No. 266,022, dated October 17, 1882.

Application filed August 6, 1879.

*To all whom it may concern:*

Be it known that I, THOMAS A. EDISON, of Menlo Park, in the State of New Jersey, have invented an Improvement in Telephones, (Case No. 182,) of which the following is a specification.

This invention relates to the transmitting-instrument, and the same is an improvement on the device described and shown in an application for patent filed by me November 1, 1878, (Case 158.)

In the drawing I have shown a section of the transmitting-instrument. The mouth-piece is of usual character. At the back of said mouth-piece is the metal diaphragm $b$, and this rests upon a ring of india-rubber, $c$, and is held in place by spring-fingers $d$. The ends of these springs, where they press upon the diaphragm, are covered with rubber to prevent the grating sounds that there would be if the metal came in contact with the diaphragm as the latter is vibrated.

$e$ is a block of insulating material, connected to the diaphragm by the screw and nut $f$. There is a circular recess in the block $e$ for the head of the attaching-screw, and in this recess is placed a button or block, $l$, of finely-divided conducting material, such as plumbago.

$h$ is a weight upon the spring-arm $i$, and the surface of this weight that is in contact with the plumbago is platinized.

It is to be understood that the carbon or similar material of inferior conducting-power is between the electrodes of the circuit, and the rise and fall of electric tension in that circuit results from greater or less intimacy of contact between the electrodes and the carbon due to the vibration of the diaphragm, as in my aforesaid application.

The initial pressure or intimacy of contact of $h$ and $l$ is regulated by the adjusting-screw $m$.

The operation of this tension-regulator is the same as of that set forth in aforesaid application, the atmospheric vibrations acting on the diaphragm $b$, producing a variation in the resistance of the carbon $l$ in the electric circuit by the difference in pressure upon the carbon $l$ resulting from the weight $h$ acting by inertia as a resistance to the movement of the diaphragm.

In my application No. 178 I have shown a method of holding the diaphragm of a telephone by means of springs pressing against one of its surfaces, and also the combination, with the diaphragm of a telephone, of a band of yielding material around the same at or near the edge, and a dampening-finger, and in my application No. 158 I have shown a weight that acts by inertia as a resistance, causing the movement of the diaphragm to vary the pressure upon the carbon. Therefore these devices are not claimed herein.

I claim as my invention—

1. The combination, in a telephone, of a metallic diaphragm, an elastic ring forming a rest for the same, a spring-finger pressing the diaphragm to its rest, an arm connected with the diaphragm near the middle, carbon or similar material in a socket in said arm, and an adjustable spring carried by the arm to apply an initial pressure to such carbon and the electric circuit including the carbon, substantially as set forth.

2. In a telephone, the combination, with the diaphragm, of an arm attached at one end to the diaphragm, a spring attached at the other end of such arm, carbon or similar material between the spring and arm, a screw passing through the spring to adjust the initial pressure on the carbon, and a weight carried by the spring to act by inertia, substantially as set forth.

3. In a telephone-instrument, a loose diaphragm, an elastic ring forming a rest for the same, and one or more spring-fingers to hold the diaphragm to its seat and yielding material between the diaphragm and fingers, substantially as set forth.

Signed by me this 1st day of August, 1879.

THOS. A. EDISON.

Witnesses:
S. L. GRIFFIN,
FRANK McLAUGHLIN.